US009317473B2

(12) United States Patent
Yao et al.

(10) Patent No.: US 9,317,473 B2
(45) Date of Patent: Apr. 19, 2016

(54) SCALABLE ROOM TEMPERATURE QUANTUM INFORMATION PROCESSOR

(75) Inventors: Norman Y. Yao, Cambridge, MA (US); Liang Jiang, Pasadena, CA (US); Alexey V Gorshkov, Pasadena, CA (US); Peter C Maurer, Cambridge, MA (US); Geza Giedke, Garching (DE); Juan Ignacio Cirac, Garching (DE); Mikhail D. Lukin, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 309 days.

(21) Appl. No.: 13/991,159

(22) PCT Filed: Dec. 14, 2011

(86) PCT No.: PCT/US2011/064971
§ 371 (c)(1),
(2), (4) Date: Oct. 3, 2013

(87) PCT Pub. No.: WO2012/082938
PCT Pub. Date: Jun. 21, 2012

(65) Prior Publication Data
US 2014/0025926 A1    Jan. 23, 2014

Related U.S. Application Data

(60) Provisional application No. 61/423,089, filed on Dec. 14, 2010.

(51) Int. Cl.
G11C 11/00     (2006.01)
G06F 15/78     (2006.01)
B82Y 10/00     (2011.01)
G06N 99/00     (2010.01)

(52) U.S. Cl.
CPC ............... *G06F 15/78* (2013.01); *B82Y 10/00* (2013.01); *G06N 99/002* (2013.01)

(58) Field of Classification Search
CPC .......... G01N 1/00; G01N 33/48; C07K 1/00; G02B 6/12; B82Y 10/00; G06N 99/002
USPC .......................................................... 712/32
See application file for complete search history.

(56) References Cited

U.S. PATENT DOCUMENTS

2009/0168494 A1*   7/2009  Lee et al. ................. 365/148
2010/0091553 A1*   4/2010  Lee et al. ................. 365/148

OTHER PUBLICATIONS

Hanson et al, Polarization and Readout of Coupled Single Spins in Diamond, Phys. Rev. Lett. 97, 087601, 2006.*

(Continued)

*Primary Examiner* — Han Yang
*Assistant Examiner* — Xiaochun L Chen
(74) *Attorney, Agent, or Firm* — Elizabeth Kim Patent Law Offices LLC (57) ABSTRACT

A quantum information processor (QIP) may include a plurality of quantum registers, each quantum register containing at least one nuclear spin and at least one localized electronic spin. At least some of the quantum registers may be coherently coupled to each other by a dark spin chain that includes a series of optically unaddressable spins. Each quantum register may be optically addressable, so that quantum information can be initialized and read out optically from each register, and moved from one register to another through the dark spin chain, though an adiabatic sequential swap or through free-fermion state transfer. A scalable architecture for the QIP may include an array of super-plaquettes, each super-plaquette including a lattice of individually optically addressable plaquettes coupled to each other through dark spin chains, and separately controllable by confined microwave fields so as to permit parallel operations.

20 Claims, 6 Drawing Sheets

(56) References Cited

OTHER PUBLICATIONS

Dutt et al, Quantum Register Based on Individual Electronic and Nuclear Spin Qubits in Diamond, Science 316, 1312-1317, 2006.*

Cappellaro et al, Coherence and Control of Quantum Registers Based on Electronic Spin in a Nuclear Spin Bath, Phys. Review Lett., 102, 210502, 2009.*

* cited by examiner

SCALABLE ROOM TEMPERATURE QUANTUM INFORMATION PROCESSOR

CROSS-REFERENCE TO RELATED APPLICATIONS

This application is a 35 U.S.C. 371 National Phase Entry Application of International Application no. PCT/US2011/064971 filed Dec. 14, 2011, which designates the U.S., and which claims benefit of priority under 35 U.S.C. 119(e) of U.S. Provisional Patent Application No. 61/423,089, filed Dec. 14, 2010 and entitled "Scalable Room Temperature Quantum Information Processor." The contents of each of these applications are incorporated herein by reference in their entireties.

BACKGROUND

The realization of a scalable quantum information processor is currently one of the central challenges at the interface of fundamental science and engineering. While progress has been made towards this goal, extending presently existing techniques to achieve fault-tolerant quantum computation in large systems with many qubits remains an extremely challenging goal.

Most extant approaches to quantum information processing impose stringent requirements on the qubit, ranging from ultra-high vacuum to ultra-low temperature. Such requirements, typically designed to isolate the qubit from external noise, often represent major practical hurdles that may eventually limit the potential technological impact of quantum information processors. Multiple challenges remain, for example challenges associated with operating at ambient temperature, individual qubit addressing at the nanoscale, and low decoherence rates.

Accordingly, the development of a realistic framework for a scalable solid-state quantum information processor capable of operating at room temperature and in a fault-tolerant fashion is of fundamental and practical importance.

BRIEF DESCRIPTION OF THE DRAWINGS

The drawings disclose illustrative embodiments. They do not set forth all embodiments. Other embodiments may be used in addition or instead.

DETAILED DESCRIPTION

The present disclosure describes methods and systems relating to room temperature solid state quantum information processors having a scalable architecture. In some embodiments, an array of NV centers are used, each NV center containing at least one nuclear spin and at least one localized electronic spin. Coupling between the NV centers is mediated by an optically unaddressable spin chain data bus.

In the present disclosure, the term "dark spin chain" means a chain of optically unaddressable spins. In the present disclosure, the term "dark spin chain data bus" means a chain of optically unaddressable spins that functions as a data bus to transfer information from one quantum register to another quantum register.

In the present disclosure, the term "qubit" means a unit of quantum information;

In the present disclosure, the term "plaquette" means a basic building block of a scalable quantum information processor.

In the present disclosure, the term "super-plaquette" means a lattice of individually optically addressable plaquettes, where each plaquette contains a single quantum register.

It is to be understood that the inventive subject matter in the present disclosure is not limited to the particular embodiments described below, as such may vary. It is also to be understood that the terminology used herein is for the purpose of describing particular embodiments only and is not intended to be limiting, since the scope of the inventive subject matter will be limited only by the appended claims. Unless defined otherwise, all technical and scientific terms used herein have the same meaning as commonly understood by one of ordinary skill in the art to which the inventive subject matter belongs.

Figure 1A:
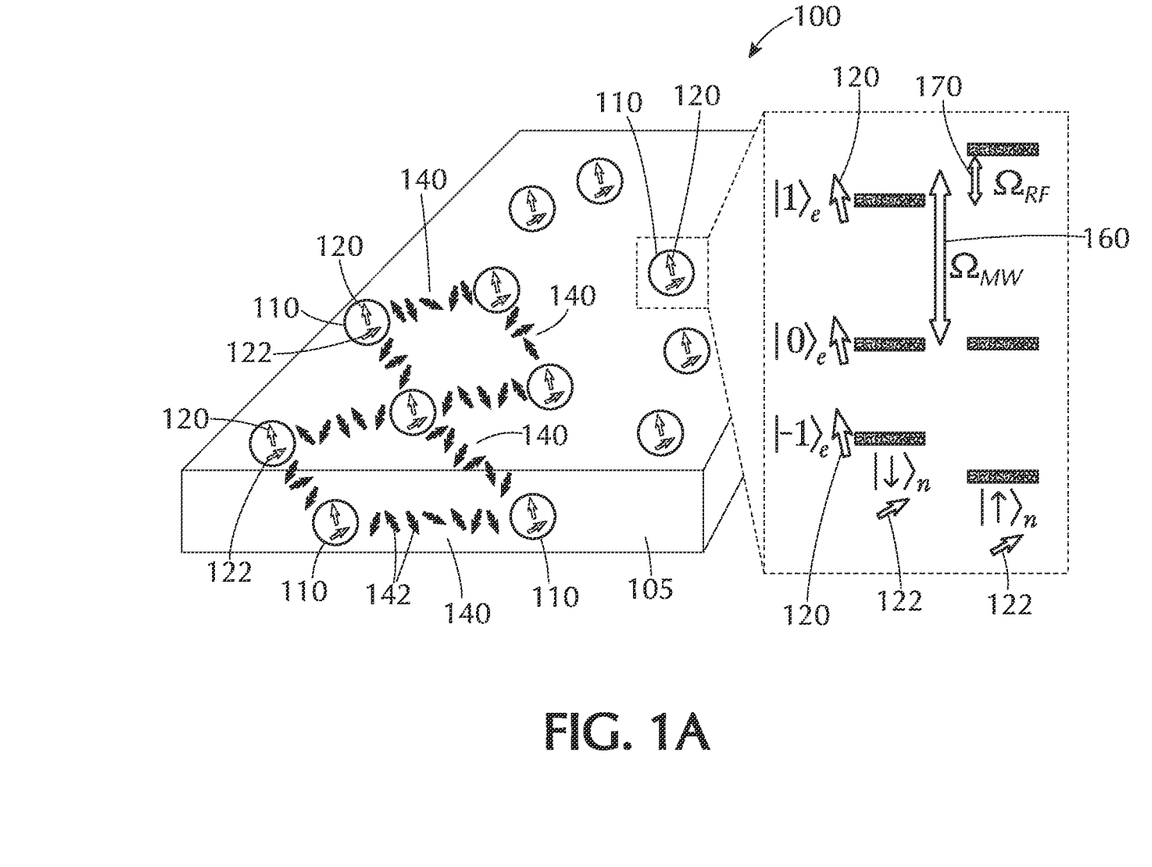
FIG. 1A is a schematic diagram of a quantum information processor in accordance with one or more embodiments of the present disclosure, including a plurality of NV (nitrogen vacancy) centers implanted within a diamond lattice and coupled to each other through a dark spin chain of optically unaddressable spins.

FIG. 1A is a schematic diagram of a quantum information processor 100 in accordance with one or more embodiments of the present disclosure. In the illustrated embodiment, the quantum information processor 100 is a solid-state quantum information processor in which individual quantum registers are embedded within a solid state lattice.

In overview, the quantum information processor 100 includes a plurality of NV centers 110 implanted within a diamond lattice 105. The NV center is a point defect in the diamond lattice, and consists of a nearest-neighbor pair of a nitrogen atom (which substitutes for a carbon atom in the lattice), and a lattice vacancy. The NV centers 110 are coupled to each other through a dark spin chain 140 of optically unaddressable spins 142.

Each one of the NV centers 110 constitutes an individual quantum register in the quantum information processor 100, and contains at least one nuclear spin 122 and at least one localized electronic spin 120. The nuclear spin 122 has a relatively long coherence time, e.g. compared to the coherence time of electronic spins. Experiments showing that nuclear spin coherence can be significantly longer than electronic spin coherence have been performed by P. Maurer at Harvard University. The nuclear spin 122 can thus serve as a memory qubit that stores quantum information, in some embodiments. The electronic spin 120 can be used to initialize, read out, and mediate coupling between nuclear spins of adjacent quantum registers, in some embodiments.

In some embodiments, at least some of the nuclear spins 122 are a nitrogen 15 isotope ($^{15}$N) having nuclear spin quantum number I=½. In different embodiments of the present disclosure, nuclear spins other than $^{15}$N may be used, including without limitation the carbon 13 isotope ($^{13}$C) having nuclear spin quantum number I=½, and a nitrogen 14 isotope ($^{14}$N) having nuclear spin quantum number I=1.

In some embodiments, the nuclear spin 122 is manipulable by RF pulses to transition from one nuclear spin state to a different nuclear spin state.

In the embodiment illustrated in FIG. 1A, coupling between the NV centers 110 is mediated by a dark spin chain 140 that includes a series of optically unaddressable spins 142. One specific implementation of such a dark spin chain 140 utilizes implanted nitrogen ion impurities having spin ½, as illustrated in FIG. 1A. In different embodiments of the present disclosure, the dark spin chain 140 may include optically unaddressable spins other than nitrogen ion impurities implanted in a diamond lattice.

In some embodiments, the NV centers 110 are spatially separated by a distance sufficient to permit individual optical initialization and readout. Such a distance may be on the order of hundreds of nanometers, typically about 400 nm to about 500 nm. In these embodiments, magnetic dipole interactions permit coherent coupling between the NV centers 110, mediated by the dark spin chain 140. In other embodiments, the NV centers may be spatially separated by a much smaller distance, for example on the order of tens of nanometers. In these embodiments, addressing make uses of sub-wavelength techniques, including without limitation Spin-Resolft. Because of the closeness of the NV centers in this case, however, their coupling no longer needs to be mediated by a dark spin chain data bus. Instead, direct dipole-dipole interactions suffice to permit coherent coupling.

In the illustrated embodiment, the single NV registers 110 contain a spin triplet electronic ground state (S=1), and can be optically pumped and initialized to a $|0\rangle_e$ spin state, which has no magnetic dipole coupling with other NV quantum registers 110 or nitrogen ion impurities 142.

In some embodiments, the Hamiltonian governing the electronic and nuclear spins of the NV quantum registers in an external magnetic field B is given by:

$$H_{e,n} = \Delta_0 S_z^2 + \mu_e B S_z + \mu_n B I_z + A S_z I_z,$$

where $\Delta_0$ represents the zero-field splitting (2.87 GHz in the illustrated exemplary embodiment), $\mu_e$ represents the electronic spin gyromagnetic ratio (−2.8 MHz/Gauss), $\mu_n$ represents the nuclear spin gyromagnetic ratio (−0.43 kHz/Gauss), and A represents the hyperfine coupling (3.0 MHz in the illustrated embodiment).

The application of the magnetic field B along the NV-axis allows for full addressability of a two-qubit system, and results in an NV energy level structure illustrated within the dashed box in FIG. 1A. As shown in FIG. 1A, a resonant MW (microwave) pulse 160 can coherently transfer the electronic spin of the quantum register 110 from the $|0\rangle_e$ state to the $|1\rangle_e$ state. After optical initialization, the electronic spin 120 of each quantum register 110 remains in the $|0\rangle_e$ state unless coherently transferred to the state by the resonant microwave pulse 160.

In the illustrated embodiment, subsequent manipulation of the nuclear spin 122 can be accomplished with RF pulses 170. The nuclear spin 122 associated with nitrogen ions (I=1/ for $^{15}$N) possesses an extremely long coherence time, and thus can serve a memory qubit in the quantum information processor 100, as explained above.

While FIG. 1A illustrates an embodiment in which the quantum registers are NV centers in a diamond lattice, different embodiments may use quantum registers other than NV centers in diamond, including without limitation: defect centers in diamond, other than NV centers; and defect centers in silicon.

Figure 1B:
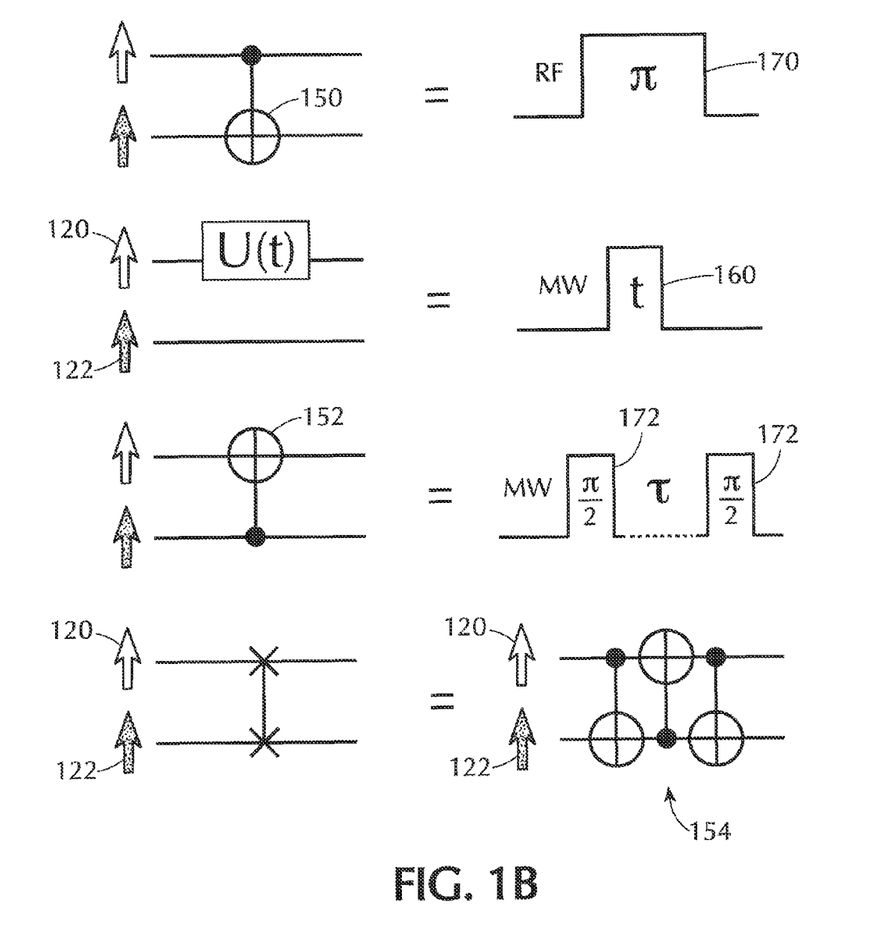
FIG. 1B illustrates two-qubit quantum operations that can be achieved using MW (microwave) and RF (radiofrequency) controls, with the quantum information processor shown in FIG. 1A.

FIG. 1B illustrates two-qubit quantum operations that can be achieved using MW (microwave) and RF controls, in accordance with one or more embodiments of the present disclosure. In particular, FIG. 1B illustrates a universal set of local two-qubit quantum operations that can occur between the NV electronic and nuclear spins, and that may be achieved using only microwave and RF controls.

Electronic spin manipulation can be accomplished with a MW field, as represented by the square MW pulse 160 in FIG. 1B, where t represents the duration of the MW pulse 160. By exploiting a hyperfine coupling between the electronic spin 120 and the nuclear spin 122, controlled-NOT operations can be achieved that are conditioned on either spin.

For a $C_e NOT_n$ gate, the hyperfine splitting allows the utilization of a selective RF π-pulse. In some embodiments, a $C_e NOT_n$ gate 150 is thus accomplished by utilizing an RF π-pulse 170, which flips the nuclear spin 122 conditioned on the electronic spin 120 being in the $|1\rangle_e$ state, as shown in FIG. 1B. For a $C_n NOT_e$ gate, the hyperfine coupling can be used to generate a controlled phase gate, which up to single qubit rotations is equivalent to the desired $C_n NOT_e$ gate. In some embodiments, a $C_n NOT_e$ gate can thus be accomplished by utilizing the hyperfine interaction between the nuclear spin 122 and the electronic spin 120 to generate a controlled-phase (CP) gate 152, where τ represents the duration of the wait time required to achieve the hyperfine-driven CP gate. Performed between two single-qubit Hadamard gates (π/2-pulses 172) on the electronic spin 120, the CP gate generates the desired $C_n NOT_e$ gate. Finally, combining the $C_e NOT_n$ gate and the $C_n NOT_e$ gates allows for the execution of a SWAP gate 154.

The state of the NV register 110, or any other chosen register implementation, can be selectively read out. As one example, to read out the nuclear qubit of a quantum register 110, a $C_n NOT_e$ gate can be applied to couple the electronic spin 120 and the nuclear spin 122, thereby allowing for readout of the electronic spin 120 based on fluorescence detection.

In embodiments in which the NV quantum registers 110 are separated by sub-optical-wavelength distances, the readout of registers may be complicated by the strong fluorescence background from neighboring NV centers. To suppress this background fluorescence, in some embodiments a red donut beam may be used with its minimum located at the particular NV center 110 being read out. In these embodiments, while the fluorescence signal from the NV register 110 located at the minimum persists, the remaining illuminated registers are dominated by the stimulated emission induced by the red donut beam.

In addition to suppressing the background noise, the red donut beam can also suppress the nuclear decoherence of the remaining NV registers, by reducing the amount of time these registers spend in the excited electronic state. After each round of fluorescence detection, the electronic spin is polarized to the $|0\rangle_e$ state, while the $I_z$ component of the nuclear spin, a quantum non-demolition observable, remains unchanged. The readout procedure can thus be repeated multiple times in order to improve the readout fidelity.

To coherently couple two spatially separated NV centers 110, two distinct approaches may be used in some embodiments of the present disclosure. One approach is appropriate for spin-state transfer along the direction of an external magnetic field gradient, in which individual addressing of spins is possible. This allows for an adiabatic sequential SWAP between neighboring qubits and, consequently, between the ends of the dark spin chain 140.

Alternatively, in situations where individual addressing of spins is not possible, for example when the direction is transverse to the external field gradient, global control pulses may be used achieve effective Hamiltonian evolution, thereby allowing for quantum state transfer through the dark spin chain 140.

In both cases, perfect state transfer and remote coupling gates are possible even when the intermediate dark spin chain 140 is completely unpolarized, i.e. the spin temperature is infinite.

Figure 2A:
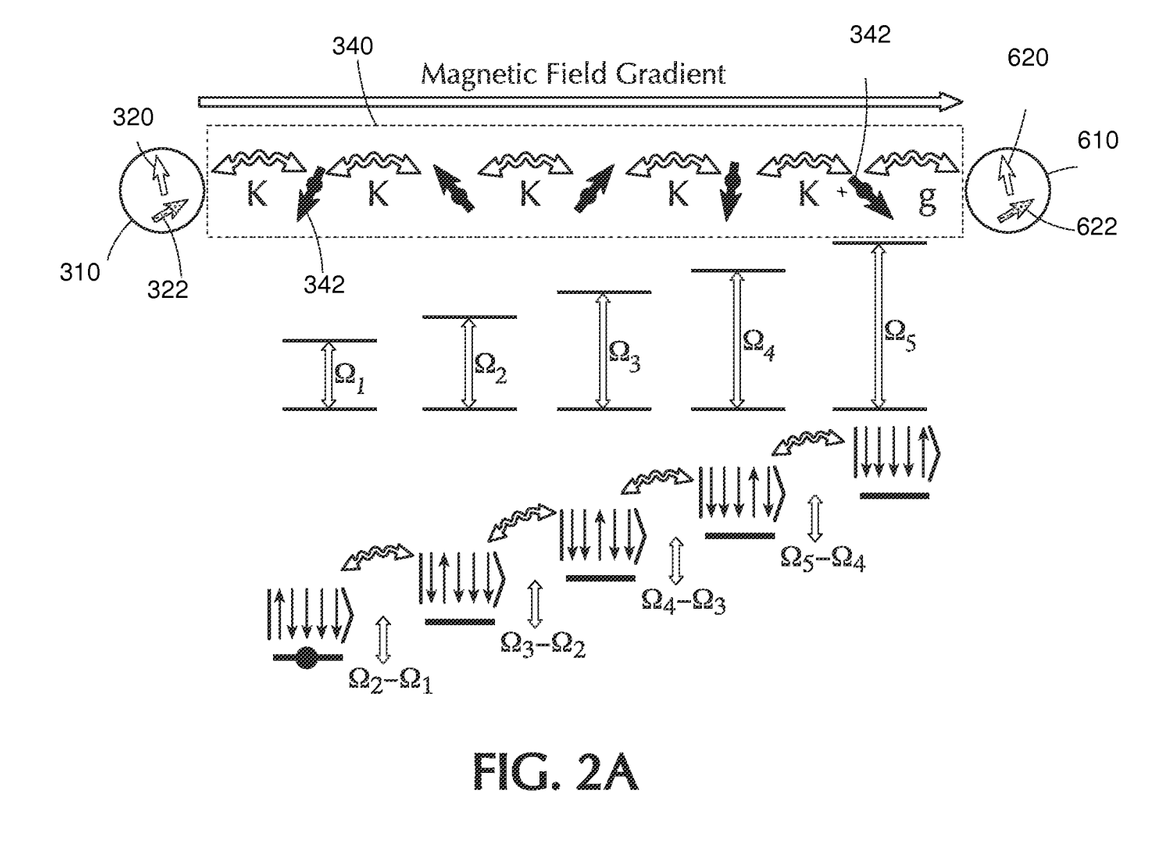
FIG. 2A illustrates a dark spin chain mediated coherent coupling of spatially separated NV registers through an adiabatic sequential SWAP along a direction parallel to an external magnetic field gradient, in accordance with one or more embodiments of the present disclosure.

FIG. 2A illustrates a dark spin chain mediated coherent coupling of spatially separated NV registers, through adiabatic sequential SWAP along a direction parallel to an external magnetic field gradient. The adiabatic sequential SWAP in a spin-½ chain relies upon the individual addressability of qubits and utilizes the magnetic dipole coupling between spin-chain elements. Individual addressing of the nitrogen ion impurities, enabled by the magnetic field gradient, allows for a slow ramping of the Rabi frequencies $\Omega_i$ and $\Omega_j$ through one another. This achieves adiabatic SWAP of the quantum states of two adjacent nitrogen ion impurities, through rapid adiabatic passage. In this way, sequential adiabatic SWAP of quantum states along the spin chain can be achieved by successively tuning individual Rabi frequencies across one another, as described in more detail below.

Under the secular approximation, the magnetic dipole coupling between a pair of neighboring spins can be reduced to Ising form:

$$H_{int} = 4\kappa S_z^1 S_z^2 + \sum_{i=1,2} (\omega_0 + \delta_i) S_z^i,$$

where $\kappa$ is the relevant component of the dipole tensor, $\omega_0$ captures the electronic Zeeman energy, and $\delta_i$ characterizes both the nuclear-spin-dependent hyperfine term (nuclear and the magnetic field gradient.

From the Ising Hamiltonian give above, an XX interaction between qubits can be distilled by driving with a Hamiltonian given by:

$H_{drive} = \Sigma_{i=1,2} 2\Omega_i S_x^i \cos[(\omega_0 + \delta_i)t]$.

Under the rotating wave approximation, in the rotating frame, and in a rotated basis with (x, y, z)→(x, −y, x), this leads to:

$H_{int} = \kappa(S_1^+ S_2^- + S_1^- S_2^+) + \Omega_1 S_z^1 + \Omega_2 S_z^2$.

The spin-flip process in the $H_{int}$ given above is highly suppressed in the limit of $|\Omega_1 - \Omega_2| \gg \kappa$, while the same process is dominant in the case of $|\Omega_1 - \Omega_2| \ll \kappa$. Hence, by slowly ramping the Rabi frequencies $\Omega_1$ and $\Omega_2$ through one another, adiabatic SWAP of the quantum states of the two Nitrogen ion impurities can be achieved through rapid adiabatic passage, as shown in FIG. 2A.

Generalizing to arbitrary length spin chains yields an interaction Hamiltonian given by:

$H_{int} = \Sigma_i \kappa (S_i^+ S_{i+1}^- + S_i^- S_{i+1}^+) + \Sigma_i \Omega_i S_z^i$, whereby the sequential adiabatic SWAP of quantum states along the spin chain can be achieved by successively tuning individual Rabi frequencies across one another.

During the adiabatic SWAP of a single pair of spins, higher order interactions, such as those resulting from next-to-nearest neighbors, are suppressed due to the differences in Rabi frequencies. By including the magnetic dipole coupling between the electronic spins of the NV registers and the spin chain quantum channel, one arrives at an effective mixed spin chain with the dark spin chain 340 connecting the two electronic spins 320 and 620 of the NV registers 310 and 610, spatially separate along a direction parallel to the external magnetic field.

The above-described adiabatic sequential SWAP is robust against variations in the coupling strength $\kappa$, which can be induced by the imprecise implantation of the Nitrogen ion impurities 342 that form the spin-½ dark spin chain 340. In particular, even for the case of varying $\kappa_{i,i+1}$, perfect adiabatic SWAP occurs so long as the rate at which $\Omega_i$ and $\Omega_{i+1}$ are ramped through one another is sufficiently small.

Figure 2B:
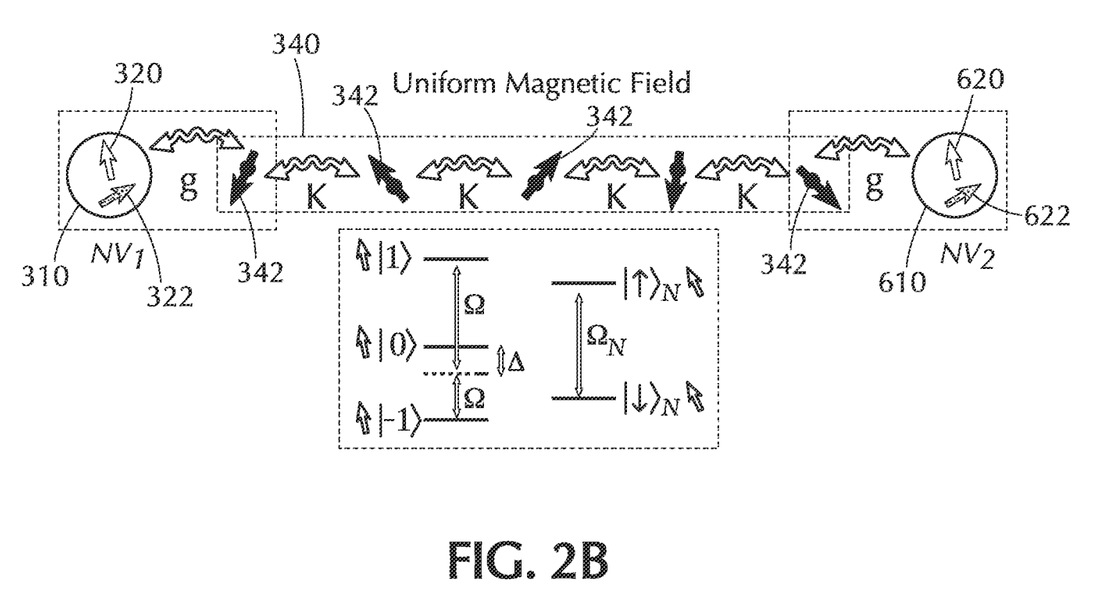
FIG. 2B illustrates a dark spin chain mediated coherent coupling of spatially separated NV registers through free-fermion state transfer in a direction transverse to an external magnetic field gradient, in accordance with one or more embodiments of the present disclosure.

FIG. 2B illustrates a dark spin chain mediated coherent coupling of spatially separated NV registers through free-fermion state transfer (FFST) in a direction transverse to an external magnetic field gradient, in accordance with one or more embodiments of the present disclosure. In FIG. 2B, the coupling strength between the end qubits and the spin chain is represented by g, and the interchain coupling strength is represented by $\kappa$. The energy level structure of the NV electronic spin and a dark impurity spin is schematically shown within the lower dashed box in FIG. 2B.

In contrast to the adiabatic sequential SWAP illustrated in FIG. 2A, the approach illustrated in FIG. 2B utilizes only global control over impurities and effective Hamiltonian evolution. The relaxation of the requirement of individual control over elements of the dark spin chain 340 renders this method applicable to coherent coupling between NV registers 310 and 610 that are disposed along a direction transverse to the magnetic field gradient. In particular, this protocol may achieve coherent coupling through an unpolarized, infinite temperature spin chain, employing purely Hamiltonian evolution under an FFST Hamiltonian given by:

$$H_{FFST} = g\left(S_{NV_1}^+ S_1^- + S_{NV_2}^+ S_N^- + h.c.\right) + \sum_{i=1}^{N-1} \kappa(S_i^+ S_{i+1}^- + S_i^- S_{i+1}^+).$$

The above Hamiltonian results in coherent interactions between the NV electronic spins, which may be understood via an analogy to eigenmode tunneling in a many-body system. Specifically, the spin chain described by $H_{FFST}$ can viewed as a system of non-interacting fermions. By tuning the NV centers 310 and 610 into resonance with a single fermionic eigenmode, an effective three-state system can be realized. Mediated by such a fermionic eigenmode, the electronic states of two remote NV centers 310 and 610 can be coherently swapped, leading to an analogous protocol for remote register coupling as further described in conjunction with FIG. 3.

The above-described SWAP gate is insensitive to the polarization of the intermediate dark spins. High-fidelity quantum state transfer can thus be achieved, provided that the fermionic mode is delocalized and that the coupling g of the NV quantum registers to the dark spin chain 340 is controllable.

By utilizing the three-level NV ground state structure, it is possible to fully control the NV-chain coupling. This tunability also ensures that FFST is fundamentally robust to experimentally relevant coupling-strength disorder, which may be induced by implantation imprecision. By separately tuning the NV-chain coupling on either side of the dark spin chain 340, it is possible to compensate for both disorder-induced asymmetry in the fermionic eigenmode as well as altered statistics of the eigenenergies.

Figure 3:
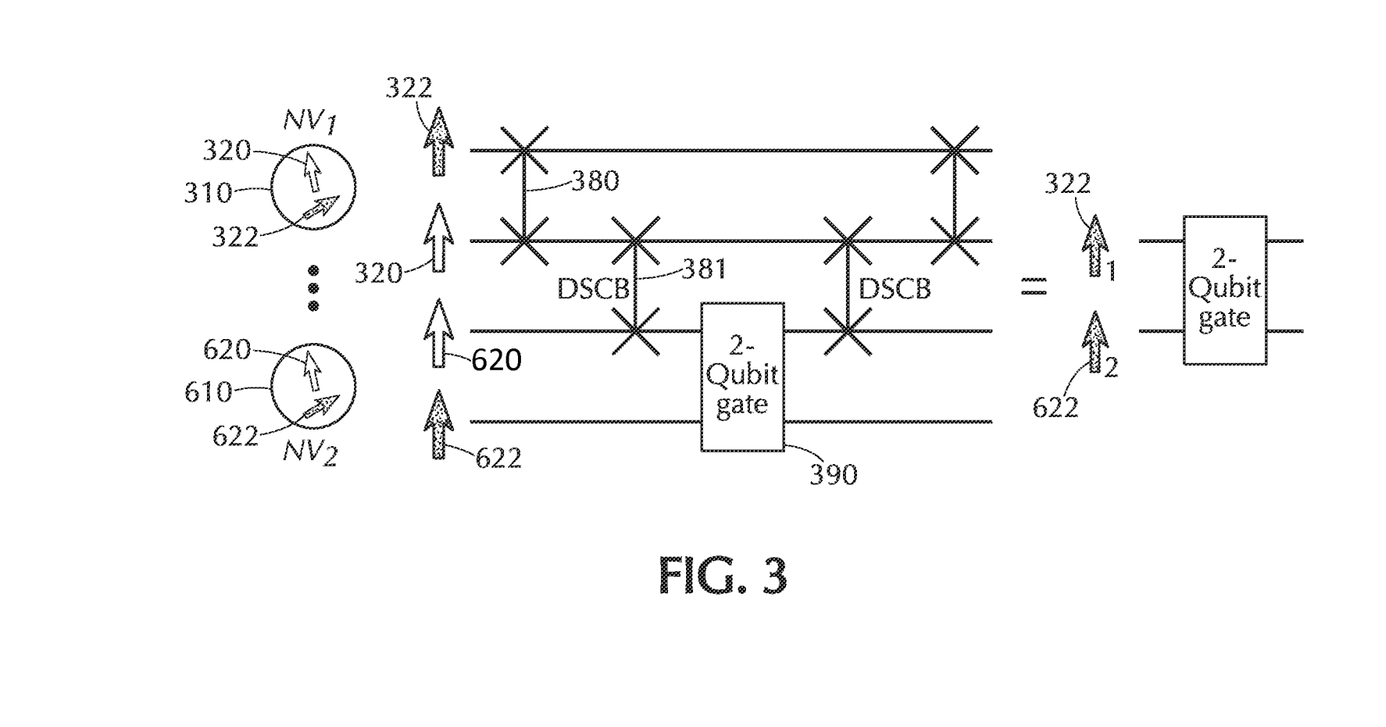
FIG. 3 is a schematic circuit diagram outlining a protocol to achieve coherent coupling between the nuclear memory qubits of spatially separated NV registers.

FIG. 3 is a schematic circuit diagram outlining a protocol to achieve coherent coupling between the nuclear memory qubits 322 and 622 of spatially separated NV registers. In the embodiment illustrated in FIG. 3, the NV registers are NV centers indicated with reference numerals 310 and 610, respectively. In the illustrated embodiment, the nuclear qubit 322 and the electronic qubit 320 of the first quantum register 310 are swapped, as illustrated by the double arrow 380. Next, the electronic qubits (320 and 620) of the two NV centers to be coupled, 310 and 610, are swapped via a dark spin chain data bus 381. Finally, a two-qubit gate 390 between the electronic spin 620 and the nuclear spin 622 of the second quantum register 610 is performed, after which the memory qubit is returned to the nuclear spin of the first NV center 310.

A key requirement for fault-tolerant quantum computation is the ability of a quantum information processor to perform parallel gate operations. In some embodiments of the present disclosure, this is achieved by considering a hierarchy of controllability, further described in conjunction with FIG. 4.

Figure 4:
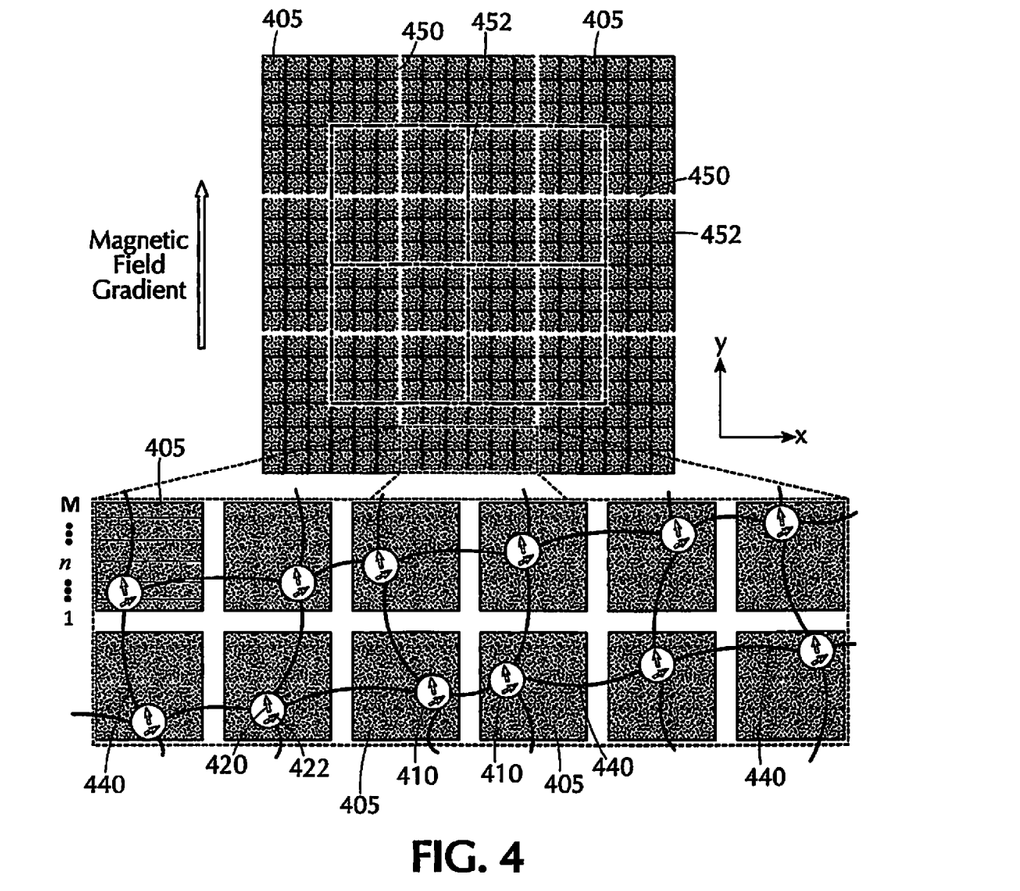
FIG. 4 illustrates a scalable architecture for a room-temperature solid-state quantum information processor, in accordance with one or more embodiments of the present disclosure.

FIG. 4 illustrates a scalable architecture for a room-temperature solid-state quantum information processor, in accordance with one or more embodiments of the present disclosure. In overview, the scalable architecture comprises an array of super-plaquettes, where each super-plaquette consists of a two dimensional lattice of plaquettes coupled to each other through dark spin chains. Each plaquette is individually optically addressable and includes a single quantum register containing at least one nuclear spin and at least one localized electronic spin As shown in FIG. 4, the lowest level of the hierarchy consists of an individual optically addressable plaquette 405. Each plaquette 405 contains a single quantum register 410. In the illustrated embodiment, the quantum register 410 contains an electronic spin 420 and a nuclear spin 422. In some embodiments, the plaquette 405 may have horizontal and vertical spatial dimensions that range from about 100 nm to about 500 nm. Other embodiments of the present disclosure may use plaquettes having different dimensions. The plaquette dimensions may be chosen such that register control and readout can be achieved using conventional far-field or sub-wavelength optical techniques.

The second level, referred to as a super-plaquette in the present disclosure, consists of a lattice of plaquettes 405 whose quantum (computational) registers are coupled through dark spin chains 440. In FIG. 4, the super-plaquettes are outline by the lines 450. Each super-plaquette is separately manipulated by confined microwave fields, for example microwave fields within micro-solenoids, thereby allowing for parallel and fault-tolerant operations at the super-plaquette level. Confining microwave fields to within super-plaquettes allows for parallel operations at the super-plaquette level, since independent microwave pulses can be used to perform simultaneous operations on the electronic spins of all computational NV registers within all super-plaquettes.

At a highest level of hierarchy, a dual super-plaquette lattice may be considered, in order to allow for quantum information transfer across boundaries of super-plaquettes and to control the quantum registers at the interface of super-plaquettes. Such a dual super-plaquette is an array of super-plaquettes, each individually controlled by confined microwave fields as described above, and is defined for example by lines 452 shown in FIG. 4. Localized microwave fields within such a dual lattice can provide a smooth transition between the boundaries of neighboring super-plaquettes.

Taking advantage of the separation of length scales inherent to optical control and microwave confinement may provide one mechanism to achieve parallelism. The hierarchical control of plaquettes, super-plaquettes, and super-plaquette arrays permits simultaneous single- and two-qubit gate operations, which are fundamental to fault-tolerant computation.

A key feature of the above-described architecture is that this design does not rely on optically resolved transitions, which are only accessible at cryogenic temperatures, thus allowing for operation at room temperature and thereby meeting one of the key practical challenges in quantum computing.

Coherent coupling between quantum registers disposed in plaquettes that are disposed adjacent to one another along the direction of the magnetic field gradient (vertically adjacent, in embodiments in which the gradient is along a vertical direction) may be achieved using the adiabatic sequential SWAP described in conjunction with FIG. 2A above, since in this situation the qubits are individually frequency addressable and there is a magnetic dipole coupling between spin-chain elements.

On the other hand, coherent coupling between NV quantum registers in adjacent plaquettes in a direction transverse to the direction of the field gradient, i.e. in a horizontal direction in embodiments in which the magnetic field gradient is in the vertical direction, may be accomplished using the free-fermion state transfer method described in conjunction with FIG. 2B, due to the relaxation of the requirement of individual control over elements of the dark spin chain.

In some embodiments, the above-described two-dimensional array of NV centers can be created via a two-step implantation process, described in conjunction with the lower part of FIG. 4. The selective manipulation of individual quantum registers within such an array is enabled by the application of a spatially dependent external magnetic field that can be expressed mathematically as $$B_z(y) = \frac{dB_z}{dy} y + B_{z,0}.$$

The external magnetic field has a 1D field gradient that is sufficiently strong to allow for spectroscopic microwave addressing of individual NV registers, each of which occupies a unique row in the super-plaquette, as described below.

The dashed box in the lower part of FIG. 4 schematically illustrates NV register implantation within a super-plaquette, in one or more embodiments of the present disclosure. In particular, two rows of individual plaquettes within a super-plaquette are shown in the dotted box. The NV registers, each containing an electronic spin 420 and a nuclear spin 422, are depicted within a staggered up-sloping array which is row-repetitive. Individual rows within a single plaquette 405 may be specified by an integer n, with n=1 being the bottom row and n=M being the top row. To achieve a staggered structure, a unique implantation row may be specified within each plaquette 405, wherein single impurities are implanted and subsequently annealed.

In the illustrated embodiment, for a given row of plaquettes the implantation row corresponding to the left-most plaquette is n=1, while the plaquette to the immediate right has implantation row n=2. This pattern may continue until the final plaquette in a given row, which by construction has the highest implantation row number.

The implantation process may be repeated for each row of plaquettes within the super-plaquette and may create an array of NV registers 410, which each occupy a unique row in the super-plaquette. Since each NV register 410 occupies a unique row within the super-plaquette, the magnetic field gradient in the y-direction allows for individual spectroscopic addressing of single NV registers 410.

Coherent coupling of spatially separated NV registers 410 in adjacent ones of the plaquettes 405 is mediated by a dark spin chain data bus, schematically represented in FIG. 4 by the curved line 440 connecting the individual NV registers 410. The second implantation step thus corresponds to the creation of these horizontal and vertical dark spin chains.

In summary, methods and systems have been described relating to a scalable, solid-state quantum information processor capable of operating at or near room temperature. The architecture is applicable to realistic conditions, which include disorder and relevant decoherence mechanisms, and includes a hierarchy of control at successive length scales. A feasible approach to room temperature quantum information processing, as described above, can greatly alleviate the stringent requirements that are currently associated with cryogenic temperatures, thereby making the realization of a scalable quantum computer significantly more practical.

While certain embodiments have been described of systems and methods relating to quantum information processors, it is to be understood that the concepts implicit in these embodiments may be used in other embodiments as well.

In the present disclosure, reference to an element in the singular is not intended to mean "one and only one" unless specifically so stated, but rather "one or more." All structural and functional equivalents to the elements of the various embodiments described throughout this disclosure, known or later come to be known to those of ordinary skill in the art, are expressly incorporated herein by reference.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

Nothing that has been stated or illustrated is intended to cause a dedication of any component, step, feature, object, benefit, advantage, or equivalent to the public. While the specification describes particular embodiments of the present disclosure, those of ordinary skill can devise variations of the present disclosure without departing from the inventive concepts disclosed in the disclosure.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the inventive subject matter in the present disclosure is not entitled to antedate such publication by virtue of prior invention.

What is claimed is:

1. A quantum information processor, comprising: a plurality of quantum registers, each quantum register containing at least one nuclear spin and at least one electronic spin; wherein at least some of the quantum registers are coherently coupled to each other by a dark spin chain;
   wherein quantum information can be optically read out from each quantum register and optically initialized at each quantum register, and moved from one quantum register to another through the dark spin chain;
   wherein the quantum registers are spatially separated from each other by a distance sufficient to permit individual optical initialization and readout; and
   wherein the quantum information processor has a scalable architecture that permits simultaneous single- and two-qubit gate operations to be performed in parallel at room temperature, the scalable architecture comprising:
   an array of super-plaquettes, each super-plaquette including a two dimensional lattice of individually optically addressable plaquettes coupled to each other through dark spin chains, each plaquette containing a single quantum register;
   wherein each super-plaquette is separately controllable by confined microwave fields so as to permit parallel operations; and wherein the quantum information is movable between the boundaries of different super-plaquettes within the array by localized microwave fields of a dual super-plaquette lattice.

2. The quantum information processor of claim 1, comprising a solid-state quantum information processor in which individual quantum registers are embedded within a solid state lattice.

3. The quantum information processor of claim 2, wherein at least some of the quantum registers comprise a NV (nitrogen-vacancy) center in a diamond lattice.

4. The quantum information processor of claim 1, wherein the dark spin chain comprises a series of optically unaddressable spins and wherein the optically unaddressable spins comprise nitrogen ion impurities implanted in a diamond lattice, the nitrogen ion impurities having a spin quantum number $I=\frac{1}{2}$.

5. The quantum information processor of claim 1, wherein the nuclear spin comprises at least one of: a nitrogen 15 isotope ($^{15}N$) having nuclear spin quantum number $I=\frac{1}{2}$; a carbon 13 isotope ($^{13}C$) having nuclear spin quantum number $I=\frac{1}{2}$; and a nitrogen 14 isotope ($^{14}N$) having nuclear spin quantum number $I=1$.

6. The quantum information processor of claim 1, wherein the nuclear spin is manipulable by RF (radiofrequency) pulses to transition from one nuclear spin state to a different nuclear spin state, and wherein the nuclear spin has a sufficiently long coherence time so as to be capable of storing quantum information and thereby provide quantum memory for the quantum information processor.

7. The quantum information processor of claim 6, wherein at least some of the electronic spins comprises a spin triplet having a spin quantum number $I=1$, and are manipulable by microwave pulses so as to transition from one electronic spin state to a different electronic spin state, and wherein each electronic spin is optically manipulable so that it can be individually polarized, initialized, and read out spectroscopically.

8. The quantum information processor of claim 7, wherein the nuclear spin and the electronic spin interact by hyperfine coupling so that controlled NOT operations can be performed, and wherein the controlled NOT operations comprise at least one $C_eNOT_n$ gate that utilizes an RF $\pi$-pulse to flip the nuclear spin conditioned on the electronic spin.

9. The quantum information processor of claim 7, wherein the nuclear spin and the electronic spin interact by hyperfine coupling so that controlled NOT operations can be performed, and wherein the controlled NOT operations comprise at least one $C_nNOT_e$ gate that is accomplished by utilizing the hyperfine coupling to generate a controlled-phase (CP) gate.

10. The quantum information processor of claim 7, wherein the nuclear spin and the electronic spin interact by hyperfine coupling so that controlled NOT operations can be performed, the controlled NOT operations comprising one or more of: a combination of $C_eNOT_n$ gates and $C_nNOT_e$ gates; and a SWAP gate.

11. The quantum information processor of claim 10, wherein at least some of the quantum registers interact through magnetic dipole coupling, and wherein an adiabatic sequential SWAP between quantum states of neighboring spins in the dark spin chain is achievable along a direction parallel to an external magnetic field gradient, so that the quantum information can be sequentially moved through the dark spin chain by successively tuning individual Rabi frequencies across one another.

12. The quantum information processor of claim 1, wherein the quantum registers comprise NV centers in a diamond lattice, and wherein quantum information is movable between one quantum register and another quantum register through the dark spin chain along a direction perpendicular to an external magnetic field gradient, by coherently coupling the quantum registers through free-fermion state transfer in a way that allows the quantum information to travel through a collective eigenmode of the dark spin chain.

13. The quantum information processor of claim 12, wherein adjacent NV centers in the quantum information processor are tunable into resonance with a single fermionic eigenmode, and wherein the electronic states of the adjacent NV centers can be coherently swapped through the single fermionic eigenmode through a SWAP gate.

14. The quantum information processor of claim 1, wherein the quantum registers comprise one of: defect centers in diamond; and defect centers in silicon.

15. The quantum information processor of claim 1, wherein the dark spin chain includes a series of optically unaddressable spins.

16. The quantum information processor of claim 1, wherein the at least one electron spin comprises a localized spin.

17. A quantum information processor having a scalable architecture, comprising: an array of super-plaquettes, each super-plaquette containing a two dimensional lattice of plaquettes that are coupled to each other through dark spin chains; wherein each plaquette includes a single quantum register containing at least one nuclear spin and at least one electronic spin; wherein each super-plaquette is separately controllable by confined microwave fields thereby allowing for parallel and fault-tolerant operations at the super-plaquette level;
wherein each one of the quantum registers occupies an individual row within each plaquette in the super-plaquette, thereby forming a staggered structure that allows for individual spectroscopic addressing of each single quantum register; and wherein quantum information is movable between the boundaries of different super-plaquettes within the array of super-plaquettes via localized microwave fields of a dual super-plaquette lattice.

18. The quantum information processor of claim 17, wherein at least some of the plaquettes are individually optically addressable and have a lateral dimension of about 100 nm to about 500 nm.

19. The quantum information processor of claim 17, wherein each super-plaquette has a lateral dimension of about 10 micrometers.

20. A method of fabricating a quantum information processor capable of performing qubit operations in parallel at room temperature, the method comprising: creating a plurality of NV centers in a diamond lattice; and generating within the diamond lattice nitrogen ion impurities so as to generate a dark spin chain configured to couple individual NV centers with each other;
wherein the quantum information processor comprises an array of super-plaquettes, each super-plaquette containing a two dimensional lattice of plaquettes that are coupled to each other through dark spin chains; wherein each plaquette is individually optically addressable and includes a single NV center containing at least one nuclear spin and at least one electronic spin;
wherein each super-plaquette is separately controllable by confined microwave fields thereby allowing for parallel and fault-tolerant operations at the super-plaquette level; and
wherein the act of generating the nitrogen ion impurities comprises: specifying an individual implantation row within each plaquette; implanting and subsequently annealing single nitrogen ion impurities within the specified implantation row; for each row of plaquettes within the super-plaquette, repeating the acts of implanting and annealing single impurities, so as to create an array of NV centers that each occupy an individual row in the super-plaquette.

* * * * *

UNITED STATES PATENT AND TRADEMARK OFFICE
CERTIFICATE OF CORRECTION

Page 1 of 1

PATENT NO. : 9,317,473 B2
APPLICATION NO. : 13/991159
DATED : April 19, 2016
INVENTOR(S) : Norman Y. Yao et al.

It is certified that error appears in the above-identified patent and that said Letters Patent is hereby corrected as shown below:

On the title page, item (73), insert the following second assignee, after the first assignee ("PRESIDENT AND FELLOWS OF HARVARD COLLEGE, Cambridge, MA (US)"):

--Assignee: CALIFORNIA INSTITUTE OF TECHNOLOGY, Pasadena, CA (US)--.

Signed and Sealed this
Nineteenth Day of July, 2016

Michelle K. Lee
*Director of the United States Patent and Trademark Office*